(12) United States Patent
Kato et al.

(10) Patent No.: US 8,366,438 B2
(45) Date of Patent: Feb. 5, 2013

(54) MOLD CLAMPING DEVICE

(75) Inventors: Naoki Kato, Nagoya (JP); Toshihiko Kariya, Nagoya (JP)

(73) Assignee: Mitsubishi Heavy Industries Plastic Technology Co., Ltd., Aichi (JP)

( * ) Notice: Subject to any disclaimer, the term of this patent is extended or adjusted under 35 U.S.C. 154(b) by 260 days.

(21) Appl. No.: 12/741,848

(22) PCT Filed: Apr. 9, 2008

(86) PCT No.: PCT/JP2008/057021
§ 371 (c)(1),
(2), (4) Date: May 7, 2010

(87) PCT Pub. No.: WO2009/069324
PCT Pub. Date: Jun. 4, 2009

(65) Prior Publication Data
US 2010/0227014 A1    Sep. 9, 2010

(30) Foreign Application Priority Data

Nov. 30, 2007    (JP) .................................. 2007-311542

(51) Int. Cl.
B29C 45/64    (2006.01)
(52) U.S. Cl. ..................................... 425/595; 425/451.9
(58) Field of Classification Search ............... 425/451.9, 425/595
See application file for complete search history.

(56) References Cited

U.S. PATENT DOCUMENTS 5,066,217 A * 11/1991 Fukuzawa et al. ............ 425/595

FOREIGN PATENT DOCUMENTS

| CN | 1550311 A | 12/2004 |
| JP | 63-212522 A | 9/1988 |
| JP | 5-228940 A | 9/1993 |
| JP | 8-267523 A | 10/1996 |
| JP | 9-24520 A | 1/1997 |
| JP | 2773332 B2 | 7/1998 |
| JP | 10-296810 A | 11/1998 |
| JP | 3299140 B2 | 7/2002 |
| JP | 2002-225100 A | 8/2002 |
| JP | 3481820 B2 | 12/2003 |
| JP | 3524622 B2 | 5/2004 |
| JP | 2007-313721 A | 12/2007 |

OTHER PUBLICATIONS

Japanese Notice of Allowance mailed Mar. 21, 2012 with English Translation.
Chinese Search Report issued in Chinese Patent Application No. 200880117443.1 on Aug. 15, 2012.

* cited by examiner

Primary Examiner — James Mackey
(74) Attorney, Agent, or Firm — Birch, Stewart, Kolach & Birch, LLP (57) ABSTRACT

In a mold clamping device including a fixed platen, a movable platen, a plurality of tie bars, and mold clamping half nuts, a pair of additional half members which is restricted in the axial direction of the tie bar and moves in an opening/closing direction of the half nuts relative to the mold clamping half nuts is further provided, and when the mold clamping half nuts are closed and mated with the screw or the ring groove of the tie bar, the additional half members are closed to hold the tie bar so that play at mated parts is removed or cancelled by fixation.

10 Claims, 10 Drawing Sheets

MOLD CLAMPING DEVICE

BACKGROUND OF THE INVENTION

1. Field of the Invention

The present invention relates to a mold clamping device used in an injection molding machine and, in particular, to a mold clamping device which is free of play (backlash) in a mold-clamping-force transmitting system and which is appropriate for high-accuracy injection molding, which requires accurate position control of a mold, such as injection compression molding and core-back molding in which foaming is conducted under reduced pressure.

Priority is claimed on Japanese Patent Application No. 2007-311542 filed on Nov. 30, 2007, the content of which is incorporated herein by reference.

2. Description of the Related Art

Figure 10:
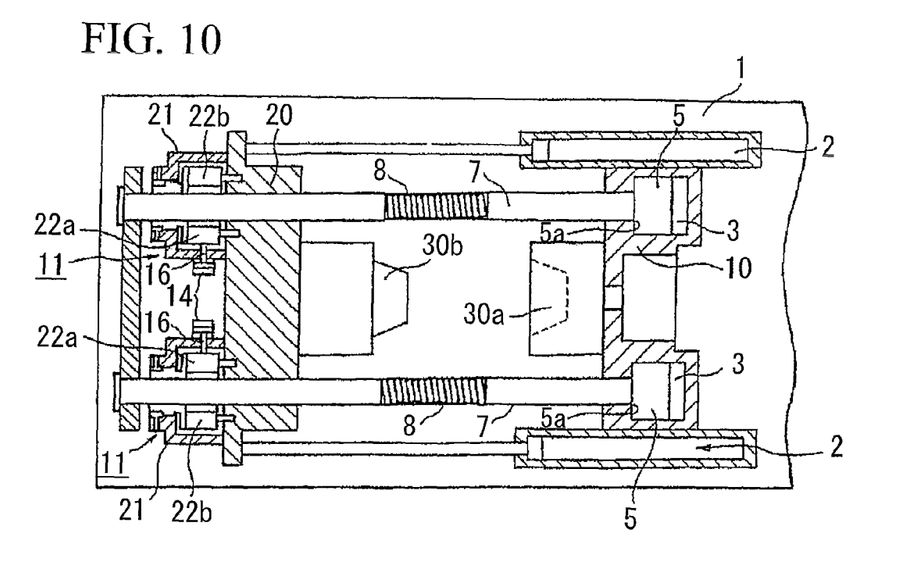
FIG. 10 is a planar cross-sectional view of a conventional injection molding machine in a state that a mold is opened.

A summary disclosed in Patent Document 1 as a mold clamping device used in a conventional injection molding machine will be described with reference to FIG. 10, and states (a) and (b) in FIG. 11. This mold clamping device is provided with: a fixed platen 10 which is installed securely on a machine base 1, has a mold clamping cylinder 3, and retains a fixed mold 30a; a movable platen 20 which is placed on the machine base 1, and is moved back and forth with respect to the fixed platen 10 by a mold opening/closing cylinder 2 so that a movable mold 30b retained thereby can be fit into or detached from the fixed mold 30a; a plurality of tie bars 7, each of which is coupled at one end with a piston 5 of the mold clamping cylinder 3, is equipped with a screw portion or a ring groove portion 8 at the other end part or the central part in the axial direction, penetrates through the movable platen 20 to arrive at a supporting plate 50, and is supported on the supporting plate 50; and half nuts 22 which are installed to the movable platen 20 and engaged with or disengaged from the screw portion or the ring groove portion 8 of the tie bar 7 (refer to FIG. 11).

Figure 11:
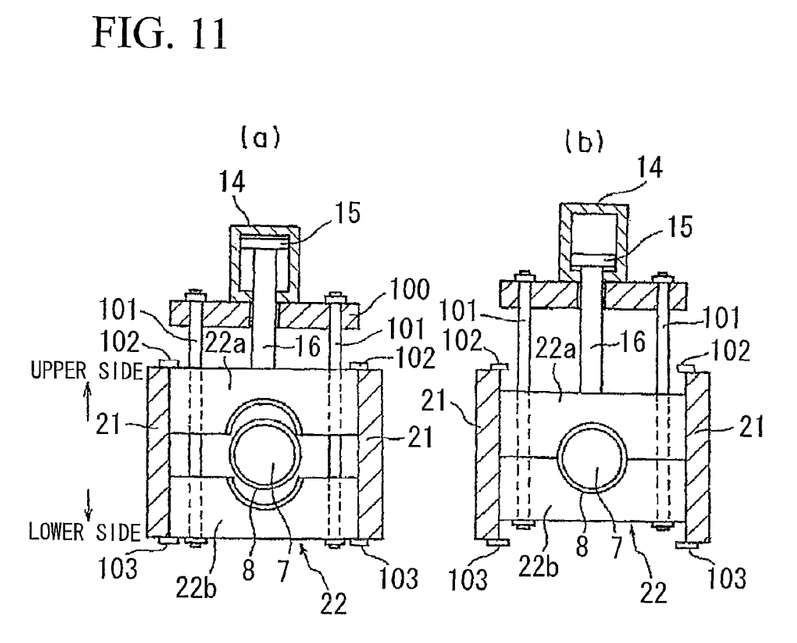
FIG. 11 is a view for explaining the actuation of a conventional tie-bar locking device in which a state (a) shows a mold-opened state and a state (b) shows a mold-clamped state.

The half nuts 22 are urged by a half-nut opening/closing cylinder 14, a piston 15, a piston rod 16 and others so that a first half nut 22a of the half nuts 22 is pulled and allowed to be in contact with a stopper 102, and an adjusting plate 100 is pushed out, thereby a second half nut 22b is pushed out by way of a connecting rod 101 fixed to the adjusting plate 100 and allowed to be in contact with a stopper 103 (refer to the state (a) in FIG. 11, disengagement state of the half nuts).

When the half-nut opening/closing cylinder 14 is urged in a reverse direction in the disengagement state of the half nuts, the piston 15, the piston rod 16 and others are urged in a pushing-out direction so that the first half nut 22a is press-fitted on and engaged with the screw portion or the ring groove portion 8 of the tie bar 7. The second half nut 22b is pulled in by way of the adjusting plate 100 and the connecting rod 101 due to this press-fitting force, and is engaged with the screw portion or the ring groove portion 8 of the tie bar 7 in such a manner that the first half nut 22a and the second half nut 22b embrace the screw portion or the ring groove portion 8 (refer to the state (b) in FIG. 11, engagement state of the half nuts).

A nut box 21 for guiding the half nuts 22 is installed securely at one end on the movable platen 20 and also provided at the other end on a mating-position adjustor 11 for the half nuts 22 and the screw portion or the ring groove portion 8 formed on the tie bar 7.

In the mold clamping device having the above-described constitution, there is provided a clearance between the half nuts 22 and the screw portion or the ring groove portion 8 formed on the tie bar 7 which is engaged with or disengaged from the half nuts 22 for their easy engagement or disengagement. Therefore, a clearance resulting from engagement of the half nuts 22 installed to the movable platen 20 with the screw portion or the ring groove portion 8 of the tie bar 7 entails play (backlash).

The technology for removing play (backlash) of a mold clamping device has been disclosed in Patent Document 2.

Specifically, the technology relates to a mold clamping device which is provided with a fixed platen, a movable platen which is arranged so as to oppose the fixed platen and allowed to move in an approaching/separating manner, a plurality of tie bars which are inserted into the movable platen to guide the movable platen so as to move in an approaching/separating manner with respect to the fixed platen, a mold opening/closing section which allows the movable platen to move smoothly in an approaching/separating manner with respect to the fixed platen, a section which compresses a mold, and a section which fixes the movable platen to the fixed platen by using a main cylinder on compression of the mold. In the mold clamping device, the fixing section is made up of an engagement groove provided at one of the movable platen and the fixed platen and a chuck member provided at the other of the movable platen and the fixed platen so as to be engaged with or disengaged from the engagement groove, thereby attaining fixation while removing backlash on engagement of the engagement groove with the chuck member.

In the mold clamping device, the section for compressing a mold is composed of a main cylinder installed at a site of the movable platen through which each of the tie bars is inserted, a piston rod having a predetermined length is inserted into the main cylinder, and the tie bar is inserted in a freely sliding manner into a hollow part formed in the piston rod along the axial direction. The fixing section is composed such that the engagement groove is provided on the piston rod of the main cylinder and the chuck member is provided on the fixed platen. The engagement groove and the chuck member are provided with side walls which are approximately orthogonal to the axial direction such that the side wall of the engagement groove and the side wall of the chuck member are opposed to each other. By allowing the side wall of the engagement groove and the side wall of the chuck member to be in contact with each other, fixation is attained while removing backlash on engagement of the engagement groove with the chuck member.

Further, in order to attain mutual contact between the side wall of the engagement groove and the side wall of the chuck member, there is provided with a cylinder and a piston rod for pressing and pulling the piston rod of the main cylinder having the engagement groove.

It is necessary to describe known technology of a mold clamping device disclosed in Patent Document 3.

The technology of Patent Document 3 is largely classified into: a center ram process in which a movable mold is directly compressed by way of a movable platen; and a plural mold clamping cylinder process in which mold clamping is performed by moving a movable platen by way of half nuts and a plurality of tie bars which are extended parts of pistons and piston rods fitted into a plurality of mold clamping cylinders. The technology related to the present invention is the latter, that is, the plural mold clamping cylinder process.

Patent Document 3 discloses a composite-type mold clamping device used in an injection molding machine which is provided with: a fixed platen to which a fixed mold is attached; a movable platen to which a movable mold is attached and which is arranged in opposition to the fixed platen and is freely moved back and forth with respect to the fixed platen by way of tie bars; a movement cylinder for allowing the movable platen to move back and forth on the tie bars; and an locking section which locks the movement of the movable platen at a predetermined position. The composite-type mold clamping device is further provided, as the locking section, with mold clamping half nuts disposed on an outer face of the movable platen and used for engagement of the tie bars with the movable platen, an opening/closing section for the mold clamping half nuts, high-pressure mold opening half nuts disposed so as to move freely on the tie bars and used for determining the engagement position of the mold clamping half nuts with the tie bars, an opening/closing section for the high-pressure mold opening half nuts, and a movement section for the high-pressure mold opening half nuts.

As the movement section for the high-pressure mold opening half nuts, there are described a mechanism in which a cylinder is attached to the fixed platen, thereby allowing the mold opening half nuts to move to any given position, and a mechanism in which a coupling bracket is attached to the movable platen and the bracket and the mold opening half nuts are guided so as to be engaged with each other by motions of the opening/closing section for the mold opening half nuts, thereby allowing the high-pressure mold opening half nuts to move to any given position by motions of the movable platen. In each of the above-described movement mechanisms, the mold clamping half nuts annexed on the opposite side across the movable platen can be reliably mated with an engagement part such as a screw or a groove formed on the tie bar, by adjusting the thickness of the movable platen and a position at which the mold clamping half nuts are attached.

In other words, according to the above-described constitution, when a mold is changed in thickness, the movement section for the mold opening half nuts adjusts the position of the mold opening half nuts by the amount of change in thickness of the mold, the opening/closing section for the mold opening half nuts is actuated so as to lock the mold opening half nuts, the movable platen is allowed to be in contact with the mold opening half nuts by actuation of the movement of the cylinder, and the mold clamping half nuts are closed. As a result, the mold clamping half nuts are reliably mated with the screw or the groove on the tie bar and the movable platen is securely locked on the tie bar.

As clearly described in Patent Document 3, an object of the technology described therein is to provide a composite mold clamping device used in an injection molding machine, etc., which is capable of making adjustment appropriately and easily when a mold is changed in thickness, and also capable of smoothly conducting mold closing and clamping operations which are complex operations, thereby attaining efficient injection molding, etc. However, this technology does not provide a mold clamping device which is free of play (backlash).

In other words, in order to remove backlash which naturally exists between the mold clamping half nuts attached on the movable platen and the screw or the groove of the tie bar when the mold clamping half nuts are mated with the screw or the groove of the tie bar, there is required an actuator which pushes the mold clamping half nuts to the opposite side of the mold opening half nuts, with the movable platen given as a supporting point, which is, however, not described at all in the above-described Patent Document.

[Patent Document 1] Japanese Patent No. 3524622 (FIG. 6 and FIG. 7)
[Patent Document 2] Japanese Unexamined Patent Application, First Publication No. H9-24520 (FIG. 1)
[Patent Document 3] Japanese Patent No. 3299140 (FIG. 3)

DISCLOSURE SUMMARY OF THE INVENTION

Problems to be Solved by the Invention

In recent years, injection-molded products have been available in remarkably diversified types and in a highly precise manner. There is a growing demand for core-back molding in which after molding materials are injected and filled into a cavity of a clamped mold, the mold is opened under control to a predetermined extent at a predetermined time to obtain foamed products, and compression molding in which molding materials are injected in a predetermined amount into a cavity of a mold, with the mold opened under control to a predetermined extent, and the mold is compressed by pressure-rising clamping at a predetermined time before the materials inside are cooled and solidified, thereby the materials are filled and extended inside the cavity to provide precision molded products with lower warping and distortion.

One of the core technologies necessary for an injection molding machine which enables the core-back molding or the compression molding is to gain strict position control of a mold clamping device. For this reason, it is essential that a movable platen be engaged with tie bars without any play.

This is because motions for allowing a movable platen to move in a mold opening direction in the core-back molding and motions for allowing a movable platen to move toward a fixed platen in the compression molding require a great force, and therefore, these motions are performed not by using a mold opening/closing section but by using a mold clamping cylinder by way of tie bars. If there is any play at an engagement part of the tie bars with the movable platen, the motions of the movable platen will not follow those of the tie bars, thereby resulting in failure of strict position control of the movable platen.

In view of the above-described reasons, a first object of the present invention is to provide a mold clamping device in which a movable platen is accurately moved while the movable platen is kept highly parallel with a fixed platen by driving and controlling a plurality of tie bars (four in general) independently, thereby performing accurate molding motions such as mold clamping, compression of materials inside a cavity and mold opening under control, and which has a mechanism of removing play (backlash) at the engagement part on engagement of transmitting systems, which are systems of transmitting mold clamping force and mold opening force, such as a piston of a mold clamping cylinder, a piston rod, tie bars and half nuts, and are provided in plural sets so as to attain a favorable mechanical balance and give stability to change in molding conditions.

A second object of the present invention is to provide a mold clamping device in which a structure of removing play (backlash) at the engagement part on engagement of plural sets of the systems of transmitting mold clamping force and mold opening force can be made relatively simple, the engagement can be easily released, and the structure can also be assembled easily and in an economically feasible way.

Means for Solving the Problems

A first aspect of the mold clamping device of the present invention is a mold clamping device which includes: a fixed platen which is installed securely on a machine base, has a mold clamping cylinder, and retains a fixed mold; a movable platen which is placed on the machine base, retains a movable mold, and moves back and forth with respect to the fixed platen by a mold opening/closing cylinder; a plurality of tie bars, each of which is coupled at one end with a piston of the mold clamping cylinder, has at the other end part or the central part in the axial direction a screw or a ring groove formed in a serration shape or in a rectangular tooth shape, and penetrates through the movable platen; mold clamping half nuts which are attached to the movable platen and engaged with or disengaged from the screw or the ring groove of the tie bar; and a pair of additional half members which is restricted in the axial direction of the tie bar and moves in an opening/closing direction of the half nuts relative to the mold clamping half nuts, in which when the mold clamping half nuts are closed and mated with the screw or the ring groove of the tie bar, the additional half members are closed to hold the tie bar so that play (backlash) at mated parts is removed or cancelled by fixation.

In the first aspect of the mold clamping device of the present invention, the additional half members may be restricted in the axial direction of the tie bar by a nut box which is fixed to the movable platen and accommodates the mold clamping half nuts and the additional half members, as with the mold clamping half nuts.

The first aspect of the mold clamping device of the present invention, the additional half members may have internally a serration-shaped internal screw or a serration-shaped ring groove which has the same shape as the external screw or the ring groove of the tie bar, and when the additional half members hold the tie bar by actuation of an actuator for opening and closing the half member, the serration-shaped internal screw or the serration-shaped ring groove may be fitted into the external screw or the ring groove of the tie bar so as to remove play (backlash) existing between the mold clamping half nuts and the additional half members by using wedge effects of inclined thread faces.

In the first aspect of the mold clamping device of the present invention, the additional half members may have internally a high-friction brake member, and the additional half members may hold the tie bar by actuation of an actuator for opening and closing the additional half members such that play (backlash) at the mated parts of the mold clamping half nuts with the tie bar is fixed to eliminate movement.

In the first aspect of the mold clamping device of the present invention, motions of the actuator for opening and closing the additional half members may be driven by a hydraulic cylinder.

In the first aspect of the mold clamping device of the present invention, motions of the actuator for opening and closing the additional half members may be given by driving a screw shaft by an electric motor.

In the first aspect of the mold clamping device of the present invention, the screw shaft driven by the electric motor may be a ball screw or a trapezoidal screw.

A second aspect of the mold clamping device of the present invention is a mold clamping device including: a fixed platen which is installed securely on a machine base, has a mold clamping cylinder, and retains a fixed mold; a movable platen placed on the machine base, retains a movable mold, and moves back and forth with respect to the fixed platen by a mold opening/closing cylinder; a plurality of tie bars, each of which is coupled at one end with a piston of the mold clamping cylinder, has at a shaft part a screw or a ring groove formed in a serration shape or in a rectangular tooth shape, and penetrates through the movable platen; mold clamping half nuts which are attached to the movable platen and engaged with or disengaged from the screw or the ring groove of the tie bar; and a pair of additional half nuts which is restricted in an opening/closing direction of the half nuts and moves in the axial direction of the tie bar relative to the mold clamping half nuts, in which when the mold clamping half nuts and the pair of additional half nuts are closed and mated with the screw or the ring groove of the tie bar, an actuator installed so as to couple the pair of additional half nuts with the mold clamping half nuts is used to allow the mold clamping half nuts and the pair of additional half nuts to move relatively in an approaching direction so that holding force is generated and play (backlash) at mated parts is removed.

In the second aspect of the mold clamping device of the present invention, a hydraulic cylinder may be used as the actuator installed so as to couple the pair of additional half nuts with the mold clamping half nuts, and holding force may be generated by pulling the pair of additional half nuts in a mold clamping direction.

In the second aspect of the mold clamping device of the present invention, the hydraulic cylinder may be installed in a direction in which the pair of additional half nuts is pushed out in the mold clamping direction so as to use the head side of the hydraulic cylinder which is more powerful than the rod side thereof.

In the second aspect of the mold clamping device of the present invention, a screw shaft driven by an electric motor may be used as the actuator to pull an internal screw fixed to the mold clamping half nuts such that the pair of additional half nuts are pushed in the mold clamping direction to generate holding force.

In the second aspect of the mold clamping device of the present invention, the screw shaft driven by the electric motor may be a ball screw or a trapezoidal screw.

In the second aspect of the mold clamping device of the present invention, two screws where threads may be cut in mutually reverse directions are formed on the screw shaft, and internal screw portions corresponding to the two screws may be provided on the mold clamping half nuts and the pair of additional half nuts such that the mold clamping half nuts and the pair of additional half nuts are relatively pulled to generate holding force.

In the second aspect of the mold clamping device of the present invention, an electromagnet may be buried as the actuator on a side face of the pair of additional half nuts opposed to the mold clamping half nuts to utilize suction by electrification.

Advantageous Effects of the Invention

According to the first aspect of the mold clamping device of the present invention, there is provided a fundamental structure of the mold clamping device in which a half-nut device annexed for engagement of the movable platen with tie bars is simply changed in structure merely by adding components or modifying the structure, thereby, the movable platen can be engaged with the tie bars for conducting precise position control without any play (backlash), thus making it possible to conduct precision molding such as compression molding and core-back molding.

The half members are restricted in the axial direction and movable relatively in the opening/closing direction, thereby providing such effects that the structure of the half members is made simple as with that of the conventional mold clamping half nuts.

The half members are engaged with the tie bar by using the screw or the ring groove formed in a serration shape, thereby providing such effects that the engagement can be made without any play.

The half members are subjected to friction combining with the tie bar, thereby providing such effects that the half members can hold the tie bar without deviation to fix play.

Since motions of the opening/closing device of the half members need a substantial force, the device is driven by a hydraulic cylinder, thereby providing such effects that play can be reliably removed or cancelled by fixation.

Motions of the opening/closing device of the half members require a substantial force. Therefore, the screw shaft is driven by using the electric motor and force-increasing actions of the screw are used to provide such effects that play can be reliably removed or cancelled by fixation.

The ball screw or the trapezoidal screw which is excellent in force-increasing actions and screw strength is used for the screw shaft, thereby providing such effects that a substantial opening/closing force is imparted to the half members.

According to the second aspect of the mold clamping device of the present invention, there is provided a fundamental structure of the mold clamping device in which a half-nut device annexed for engagement of the movable platen with the tie bar is simply changed in structure merely by providing additional components or modifying the structure, thereby removing the mating backlash, and the movable platen is firmly fixed to the tie bar, thus making it possible to conduct precision molding such as compression molding and core-back molding by directly transmitting precise position control of the tie bar to the movable platen.

Since the mating backlash is removed by pulling force of a hydraulic cylinder, such effects are provided that holding force can be imparted stably and accurately.

A stronger pressing force which is primarily characterized by a hydraulic cylinder is utilized to provide such effects that play can be removed more reliably.

In place of a hydraulic cylinder which may cause oil leakage, an electric motor and a screw-type actuator are used for driving, thereby providing such effects that holding force is strictly imparted, with a clean working environment maintained. Further, such effects are obtained that a substantially powerful screw-type actuator is provided. Still further, such effects are obtained that a screw-type actuator quick in motion is provided. In addition, since holding force of the mold clamping half nuts and that of the half nuts can be absorbed by the screw shaft, such effects are provided that loads of the holding force resulting from a main body of the electric motor are negligible.

The mating backlash can be removed and restricted by using a downsized built-in electromagnet, thereby providing such effects that a simply-structured and well-designed mold clamping device is available.

A mechanism of removing and restricting the mating backlash is installed on a face opposite to a face on which a mold is attached, thereby the mold can be attached without any problems. There are also provided such effects that the size of a mold attachable to a platen is not adversely influenced.

Each of four tie bars is independently fixed to the movable platen. Therefore, even when these four tie bars are moved independently on core-back molding or compression molding, the movable platen follows the motions of each of the tie bars, thus making it possible to attain strict position control. For example, in a mold reduced in parallelism due to a lapse in time or the like, each of these tie bars is independently moved, and a movable platen is allowed to move with respect to a fixed platen in an inclined manner, thus making it possible to gain control by correcting the parallelism of a molded product inside the mold at high accuracy.

DESCRIPTION OF THE REFERENCE SYMBOLS

201: Fixed platen
202: Movable platen
203: Mold clamping cylinder
204: Piston
205: Tie bar
205a: Screw or ring groove
206a, 206b, 215a, 218a, 221a, 224a, 227a: Mold-clamping half nut
207a, 207b, 216a, 219a, 222a, 225a, 228a: Additional half nut
208: Nut box
208a: Guide plate
209, 209a, 217a, 220a: Actuator
210: Mold opening/closing cylinder
211a: Additional half member
223a, 226a: Electric motor
223r, 226r: Screw shaft
229a: Electromagnet
230a: Fixed mold
230b: Movable mold

DETAILED DESCRIPTION OF THE INVENTION

First Embodiment

Figure 1:
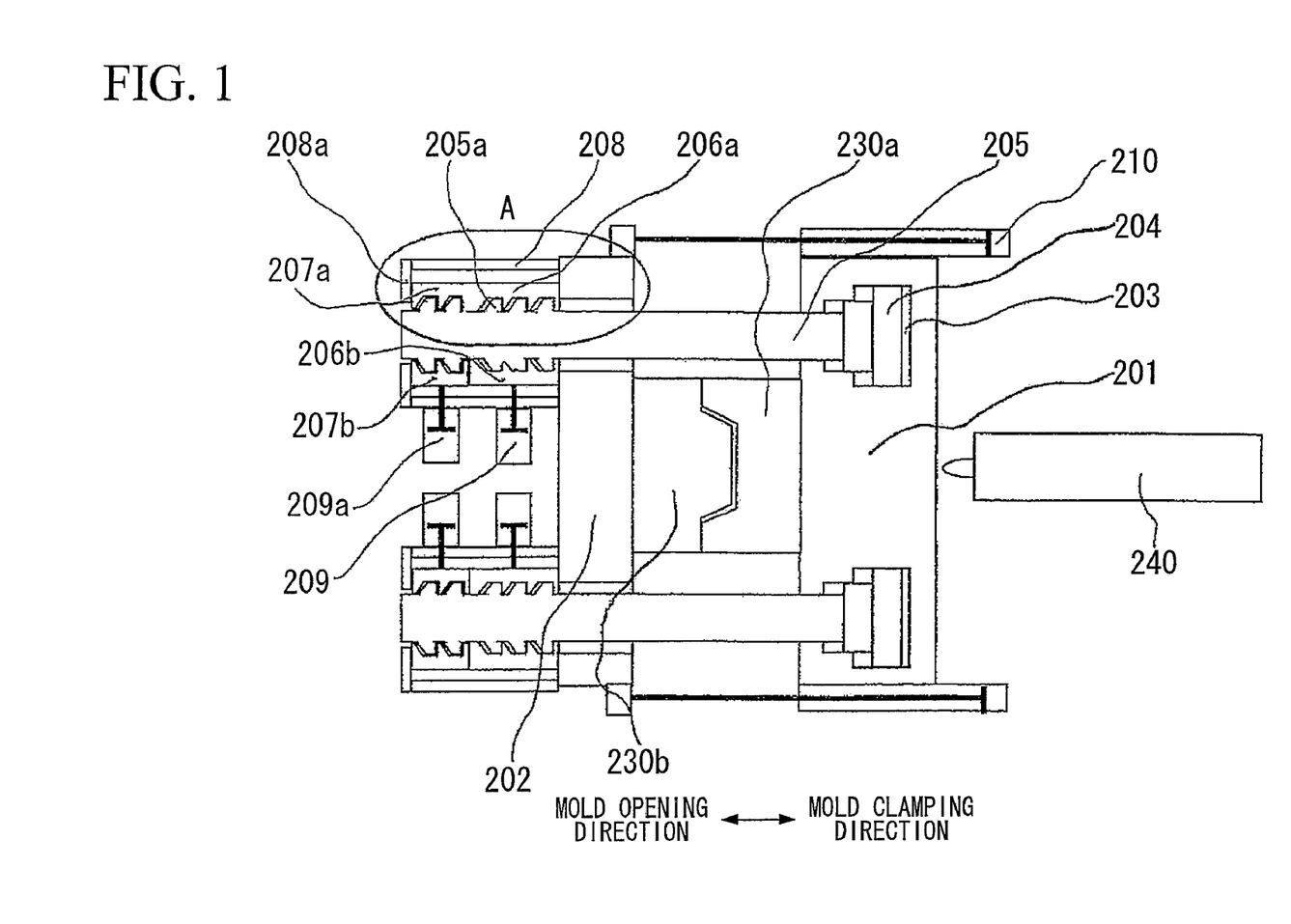
FIG. 1 is a schematic planar cross-sectional view of a mold clamping device used in an injection molding machine according to a first embodiment of the present invention which shows a state that a mold is closed and clamped or the mold is being opened and closed under control.
Figure 2:
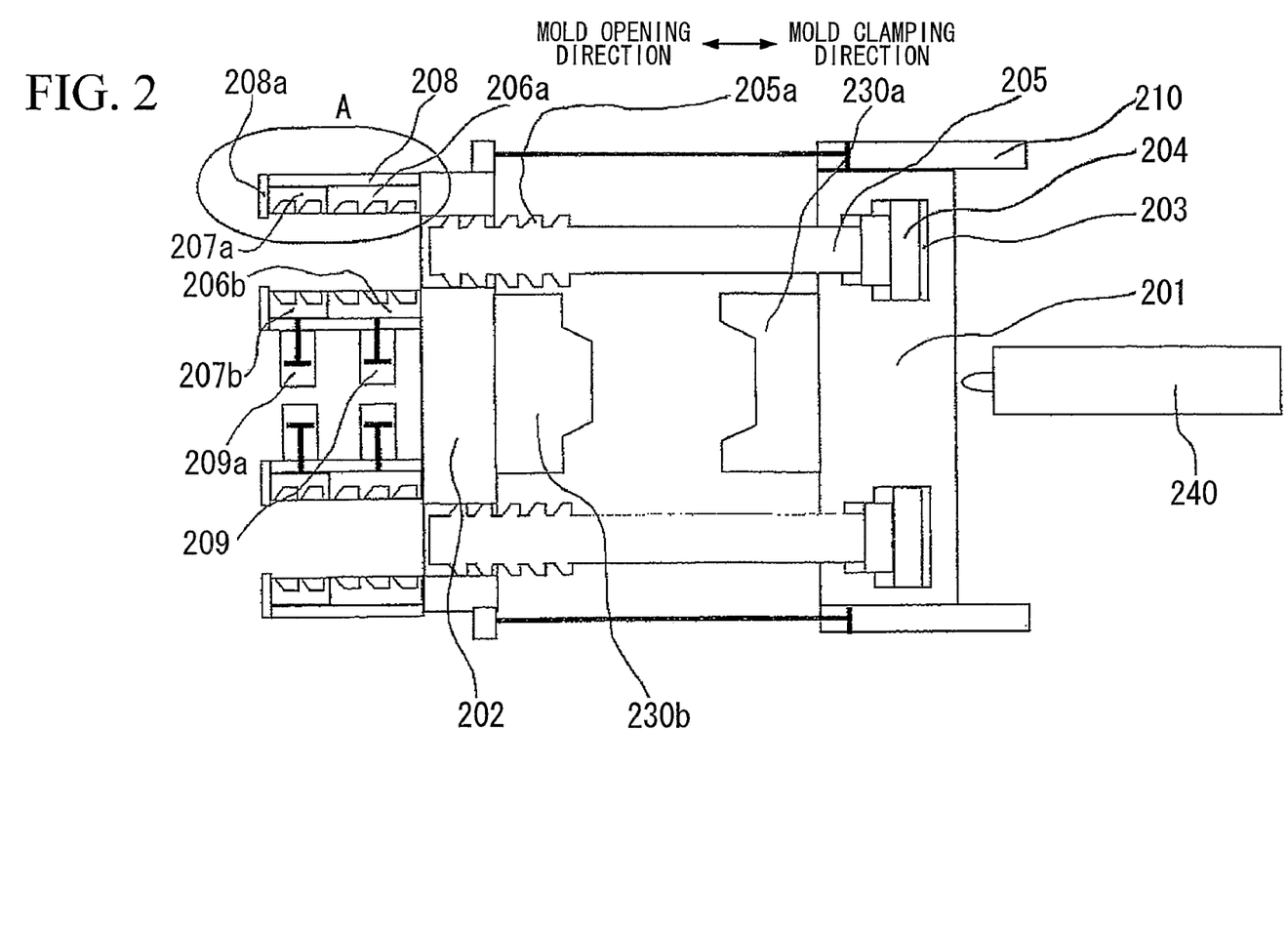
FIG. 2 is a schematic planar cross-sectional view which shows a state that the mold clamping device given in FIG. 1 is opened and a movable platen is released from tie bars and disposed at a mold-opened position by actions of a mold opening/closing cylinder.

A description will be given of a first embodiment of the present invention with reference to the drawings. FIG. 1 is a schematic planar cross-sectional view of a mold clamping device used in an injection molding machine which shows a state that a mold is closed and clamped or the mold is being opened and closed under control. FIG. 2 is a schematic planar cross-sectional view which shows a state that the mold clamping device given in FIG. 1 is opened and a movable platen is released from tie bars and disposed at a mold-opened position by actions of a mold opening/closing cylinder. States (a) to (d) in FIG. 3 are detailed schematic planar cross-sectional views which show actions of the part A given in FIG. 1 and FIG. 2.

In FIG. 1 and FIG. 2, there is shown a mold clamping device which is provided with: a fixed platen 201 which is placed at one end of a machine base (not illustrated) and to which a mold clamping cylinder 203, a mold opening/closing cylinder 210, a fixed mold 230a, an injection screw cylinder 240 and others are installed; a movable platen 202 which is placed at the other end of the machine base (not illustrated), retains a movable mold 230b, and moves back and forth with respect to the fixed platen 201 by the mold opening/closing cylinder 210; a plurality of tie bars 205, each of which is coupled at one end with a piston 204 of the mold clamping cylinder 203, has a serration-shaped screw or a serration-shaped ring groove 205a at the other end part in the axial direction, and penetrates through the movable platen 202; mold clamping half nuts 206a, 206b which are provided on the movable platen 202 and are capable of being engaged with or disengaged from the screw or the ring groove 205a of the tie bar 205; and an actuator 209 for opening and closing the mold clamping half nuts. Further, in the mold clamping device, another pair of additional half nuts 207a, 207b and an actuator 209a for opening and closing them are additionally provided. The pair of additional half nuts 207a, 207b is internally installed in a nut box 208 extending perpendicularly to the movable platen 202, and is in contact with a guide plate 208a annexed at an end of the nut box 208. The mold clamping half nuts 206a, 206b and the additional half nuts 207a, 207b are constituted so as to be restricted (coupled) in the axial direction of the tie bars but be capable of moving in the opening/closing direction, respectively.

In FIG. 1 and FIG. 2, a hydraulic cylinder is shown as a mold open/close driving section. However, a screw shaft driven by an electric motor may be used without any problem in place of the hydraulic cylinder. These drawings show a case in which actuators for opening and closing the mold clamping half nuts and additional half nuts are hydraulic cylinders. Further, these drawings show a case in which the screw or the ring groove of the tie bar and that of the half nuts are formed in a serration shape. However, since similar actions and effects are obtained by that formed in a rectangular tooth shape, a description thereof is omitted here. This also applies hereinafter in FIG. 3 to FIG. 9.

Figure 3:
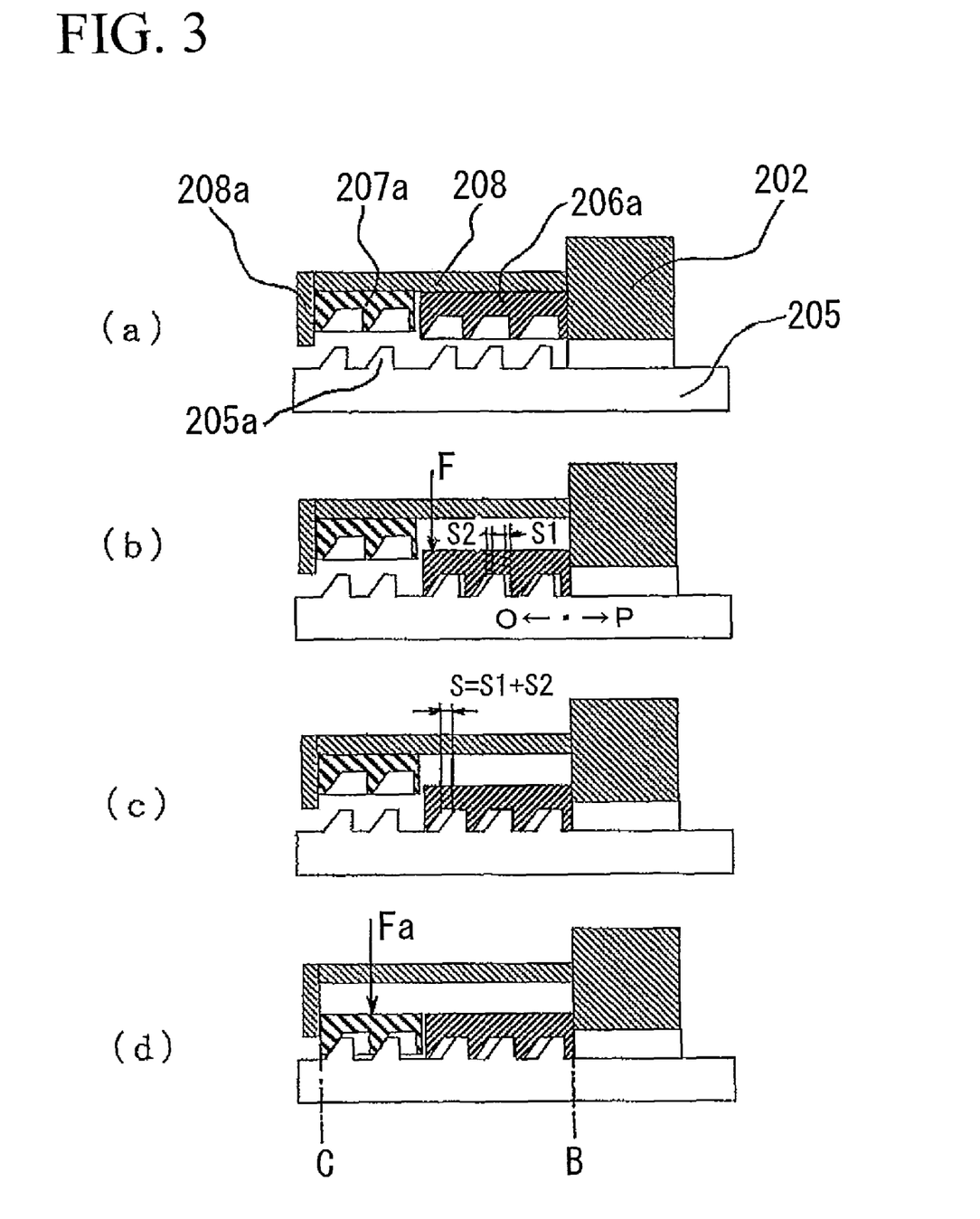
FIG. 3 is a detailed schematic planar cross-sectional view which shows action sequences of the part A given in FIG. 1 and FIG. 2 by breaking down into states (a) to (d).

FIG. 3 is a schematic planar cross-sectional view showing the screw or the ring groove 205a of the tie bar 205, the nut box 208 annexed to the movable platen 202, the additional half nut 207a internally installed in the nut box 208 so as to be in contact with the guide plate 208a annexed to the nut box 208, and the mold clamping half nut 206a. (The additional half nut 207a and the other additional half nut 207b, and the mold clamping half nut 206a and the other mold clamping half nut 206b, are axially symmetrical to the shaft of the tie bar, and the other additional half nut 207b and the other mold clamping half nut 206b are located outside the part A. Therefore, the other additional half nut 207b and the other mold clamping half nut 206b are not illustrated. This applies to subsequent descriptions.)

A description will be given in sequence for the actions with reference to the states (a) to (d) in FIG. 3.

The state (a) in FIG. 3 shows the part A in a state that from a mold-opened state (refer to FIG. 2), the mold opening/closing cylinder 210 pulls the movable platen 202 toward the fixed platen 201 to close the mold. However, the mold clamping half nut 206a and the additional half nut 207a (one of another pair of additional half nuts) are both in a released state. In this state, the movable platen 202 is not engaged with the tie bar 205.

The state (b) in FIG. 3 shows a state that from the state (a) in FIG. 3, as a result of position control of the tie bar 205, when threads of the screw or the ring groove 205a are positionally in alignment with an internal screw or a ring groove of the mold clamping half nut 206a, the actuator 209 (refer to FIG. 1) for opening and closing the mold clamping half nut 206a is actuated to generate engagement force F so that the mold clamping half nut 206a is engaged with the screw or the ring groove 205a.

In the state (b) in FIG. 3, the tie bar 205 is engaged with the movable platen 202 while internally having clearances S1, S2 for engagement which naturally exist at mated parts between the mold clamping half nut 206a and the tie bar 205. Then, even when an attempt is made to move the movable platen 202 in a predetermined amount by moving the tie bar 205 in the mold clamping direction (given by the arrow P) or in the mold opening direction (given by the arrow O) by hydraulic control of the mold clamping cylinder 203, since the tie bar 205 makes idle movement due to the clearance S1 or S2, the movable platen 202 is not allowed to move instantly, causing a variance in precision molding.

The state (c) in FIG. 3 shows a state that, with the movable platen 202 kept at a fixed position, the tie bar 205 is moved in the mold clamping direction (given in the arrow P) until the clearance S1 becomes zero. By this step, force and positional change of the tie bar 205 in the mold clamping direction (given by the arrow P) are transmitted accurately to the movable platen 202 without delay.

The state (d) in FIG. 3 shows a state that the additional half nut 207a (one of another pair of additional half nuts) holds the screw or the ring groove 205a of the tie bar 205 by pressing force Fa resulting from actuation of the actuator 209a for opening and closing the additional half nut 207a, and presses the screw or the ring groove 205a of the tie bar 205 while applying axial force thereto by wedge effects of serration-shaped mating faces. As a result, the additional half nut 207a attempts to move in the mold opening direction (given by the arrow O) due to reaction force received from the mating faces, thereby pushing the guide plate 208a in the mold opening direction (given by the arrow O), that is, pulling the nut box 208 and the movable platen 202 in the mold opening direction. At the same time, the additional half nut 207a imparts the same amount of reaction force to the tie bar 205 in the mold clamping direction (given by the arrow P) by way of the screw or the ring groove 205a of the tie bar 205.

However, as shown in the state (c) in FIG. 3, the movable platen 202 is in contact with the tie bar 205 without any clearance by way of the mold clamping half nut 206a. Therefore, pulling force in the mold opening direction (given by the arrow O) is only transmitted from the movable platen 202 to the mold clamping half nut 206a.

As a result, as shown in the state (d) in FIG. 3, when the additional half nut 207a is pressed to the screw or the ring groove 205a of the tie bar 205 by the actuator 209a, holding force is generated between side faces B and C of these half nuts 206a, 206b, and the mated parts of the half nuts 206a, 207a with the screw or the ring groove 205a of the tie bar 205 are fixed, with a clearance S retained internally, thereby removing play at the mated parts.

Second Embodiment

Figure 4:
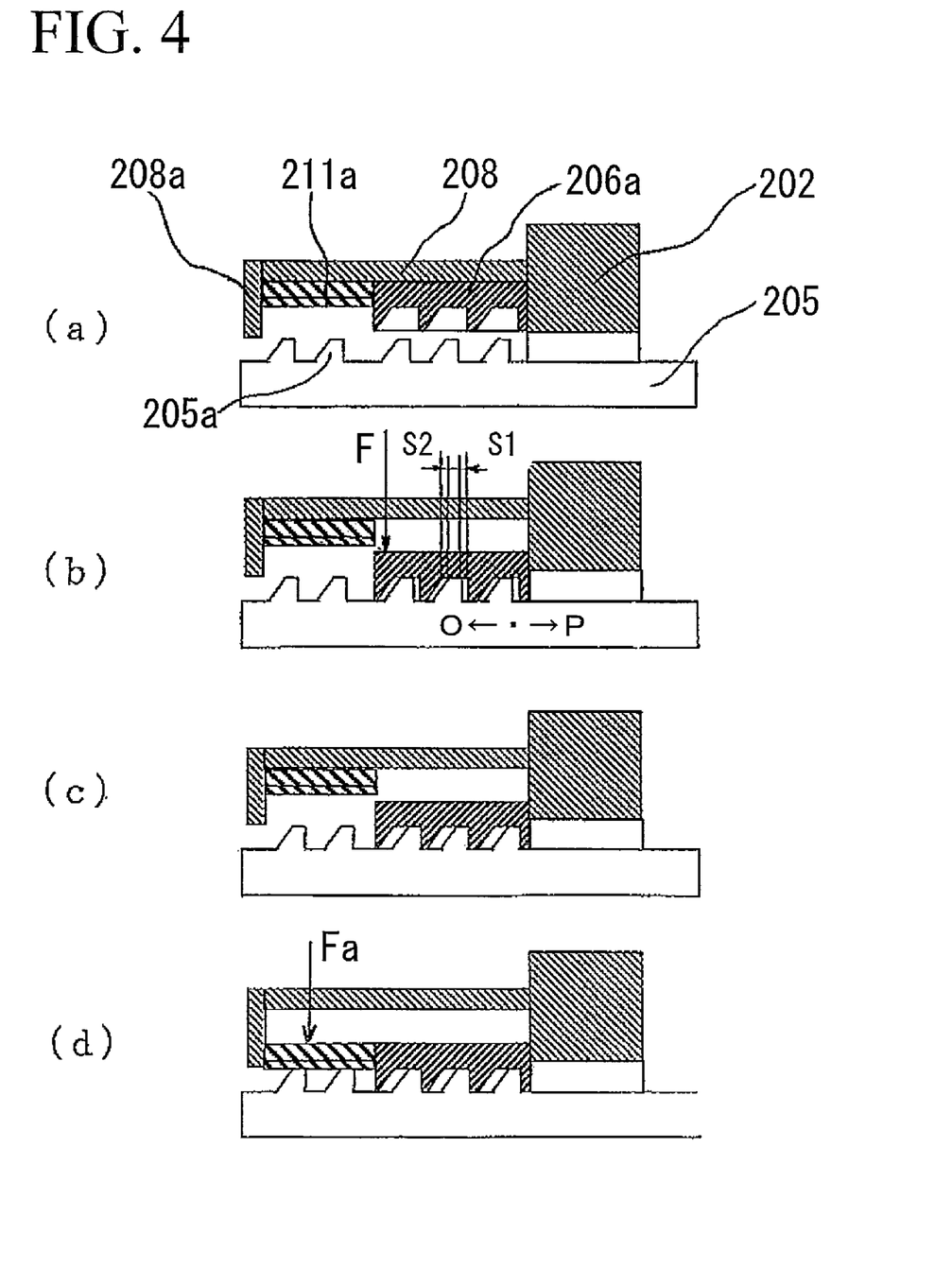
FIG. 4 is a detailed schematic planar cross-sectional view which shows action sequences of the part A given in FIG. 1 and FIG. 2 in a second embodiment of the present invention by breaking down into states (a) to (d).

A description will be given of a second embodiment of the present invention with reference to the drawings. States (a) to (d) in FIG. 4 are detailed schematic planar cross-sectional views which show action sequences of the part A in a difference structure. What is different from the states (a) to (d) in FIG. 3 is that in place of the additional half nuts 207a, 207b having internally an internal screw or a ring groove formed in a serration shape, there is provided a half member 211a which is substantially similar in outer shape to the additional half nuts 207a, 207b but has internally a high-friction sliding-preventive member (for example, a brake member).

The state (a) in FIG. 4 shows the part A in a state that a mold is closed. The mold clamping half nut 206a and the additional half member 211a (one of another pair of additional half members) are both in a released state. In this state, the movable platen 202 is not engaged with the tie bar 205.

The state (b) in FIG. 4 shows a state that the screw or the ring groove of the mold clamping half nut 206a is positionally in alignment with the corresponding screw or the ring groove 205a of the tie bar 205, and the actuator 209 (refer to FIG. 1) for opening and closing the mold clamping half nut 206a is actuated to generate engagement force F so that the screw portion or the ring portion of the mold clamping half nut 206a is engaged with that of the tie bar 205.

The state (c) in FIG. 4 shows a state that, with the movable platen 202 kept at a fixed position, the tie bar 205 is moved in the mold clamping direction (given by the arrow P) until the clearance S1 becomes zero.

In the state (d) in FIG. 4, the additional half member 211a (one of another pair of additional half members) moves to a position between the guide plate 208a and the mold clamping half nut 206a due to pressing force Fa resulting from actuation of the actuator 209a for opening and closing the additional half member 211a, and reliably holds an outer face of the screw or the ring groove 205a of the tie bar 205. As a result, since the tie bar 205 is connected with the additional half member 211a without any relative movement so as to fix the screw or the ring groove 205a of the tie bar 205 positioned between the guide plate 208a and the movable platen 202, no movement is occurred even though the clearance S (play or backlash) exists therebetween.

Third Embodiment

Figure 5:
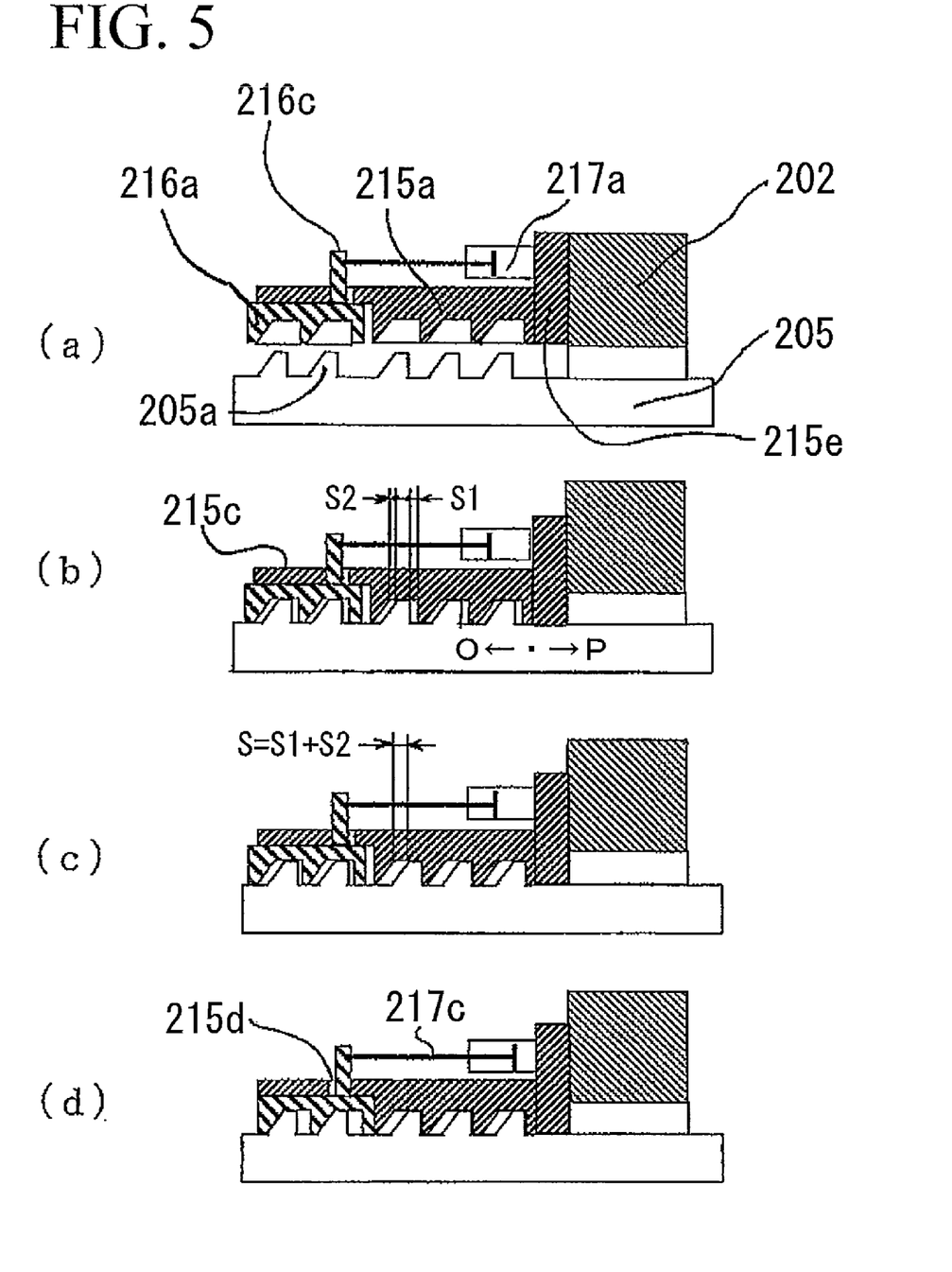
FIG. 5 is a detailed schematic planar cross-sectional view which shows action sequences of the part A given in FIG. 1 and FIG. 2 in a third embodiment of the present invention by breaking down into states (a) to (d).

A description will be given of a third embodiment of the present invention with reference to the drawings. States (a) to (d) in FIG. 5 are detailed schematic planar cross-sectional views showing a part corresponding to the part A given in FIG. 1 and FIG. 2. The third embodiment is different from the first embodiment in that an additional half nut 216a is forcibly opened and closed in conjunction with a mold clamping half nut 215a, thereby only one opening/closing actuator is provided for the mold clamping half nut 215a and the additional half nut 216a. The additional half nut 216a (one of another pair of additional half nuts) is accommodated inside a guide part 215c, which has a tunnel-shaped cross section orthogonal to the shaft of the tie bar and extends integrally from the mold clamping half nut 215a to the side opposite to the movable platen, in such a manner that the additional half nut 216a is capable of moving with respect to the tie bar 205 in the axial direction. A projected member 216c formed integrally with the additional half nut 216a is inserted into a hole 215d formed in the guide part 215c. A piston rod 217c of an actuator 217a is coupled with the projected member 216c, by which, as shown in the states (c) and (d) in FIG. 5, the additional half nut 216a is allowed to move inside the guide part 215c. More specifically, the actuator 217a is actuated from the state (c) in FIG. 5 to the state (d) in FIG. 5, thereby generating holding force between the mold clamping half nut 215a and the additional half nut 216a (one of another pair of additional half nuts). The reference numeral 215e denotes a perpendicular plate formed integrally with the mold clamping half nut 215a. The perpendicular plate 215e firmly fixes a cylinder portion of the actuator 217a and is capable of moving back and forth along the movable platen 202 in a direction orthogonal to the shaft of the tie bar 205.

The state (a) in FIG. 5 shows the part A in a state that from a mold-opened state (refer to FIG. 2), the mold opening/closing cylinder 210 pulls the movable platen 202 toward the fixed platen 201 to close the mold. However, the mold clamping half nut 215a and the additional half nut 216a (one of another pair of additional half nuts), which is accommodated in the mold clamping half nut 215a in a freely sliding manner in the axial direction of the tie bar 205, are both in a released state. At this time, the movable platen 202 is not engaged with the tie bar 205.

The state (b) in FIG. 5 shows a state that, when the screw or the ring groove 205a of the tie bar 205 is mated with the mold clamping half nut 215a as a result of position control of the tie bar 205, the actuator 209 (refer to FIG. 1) for the mold clamping half nut 215a is actuated, and the perpendicular plate 215e moves along the movable platen 202 toward the tie bar 205, thereby the mold clamping half nut 215a and the additional half nut 216a are engaged with the ring groove 205a.

The state (c) in FIG. 5 shows a state that the tie bar 205 is allowed to move in the mold clamping direction (given by the arrow P) until the clearance S1 becomes zero. By this step, there becomes no play on movement of the tie bar 205 in the mold clamping direction (given by the arrow P).

As shown in the state (d) in FIG. 5, the additional half nut 216a (one of another pair of additional half nuts) is pulled in the mold clamping direction (given by the arrow P) by actuation of the actuator 217a, thereby the screw or the ring groove 205a of the tie bar 205 is held and fixed by the mold clamping half nut 215a and the additional half nut 216a, with the clearance S retained at mated parts. Therefore, it is possible to remove play. (In this case, in order to meet functions satisfactorily, the other actuator 217b for holding, the other additional half nut 216b, and the other mold clamping half nut 215b (neither of them is illustrated) may actuate in synchronization with the actuator 217a, the additional half nut 216a, and the mold clamping half nut 215a. This also applies hereinafter.)

Fourth Embodiment

Figure 6:
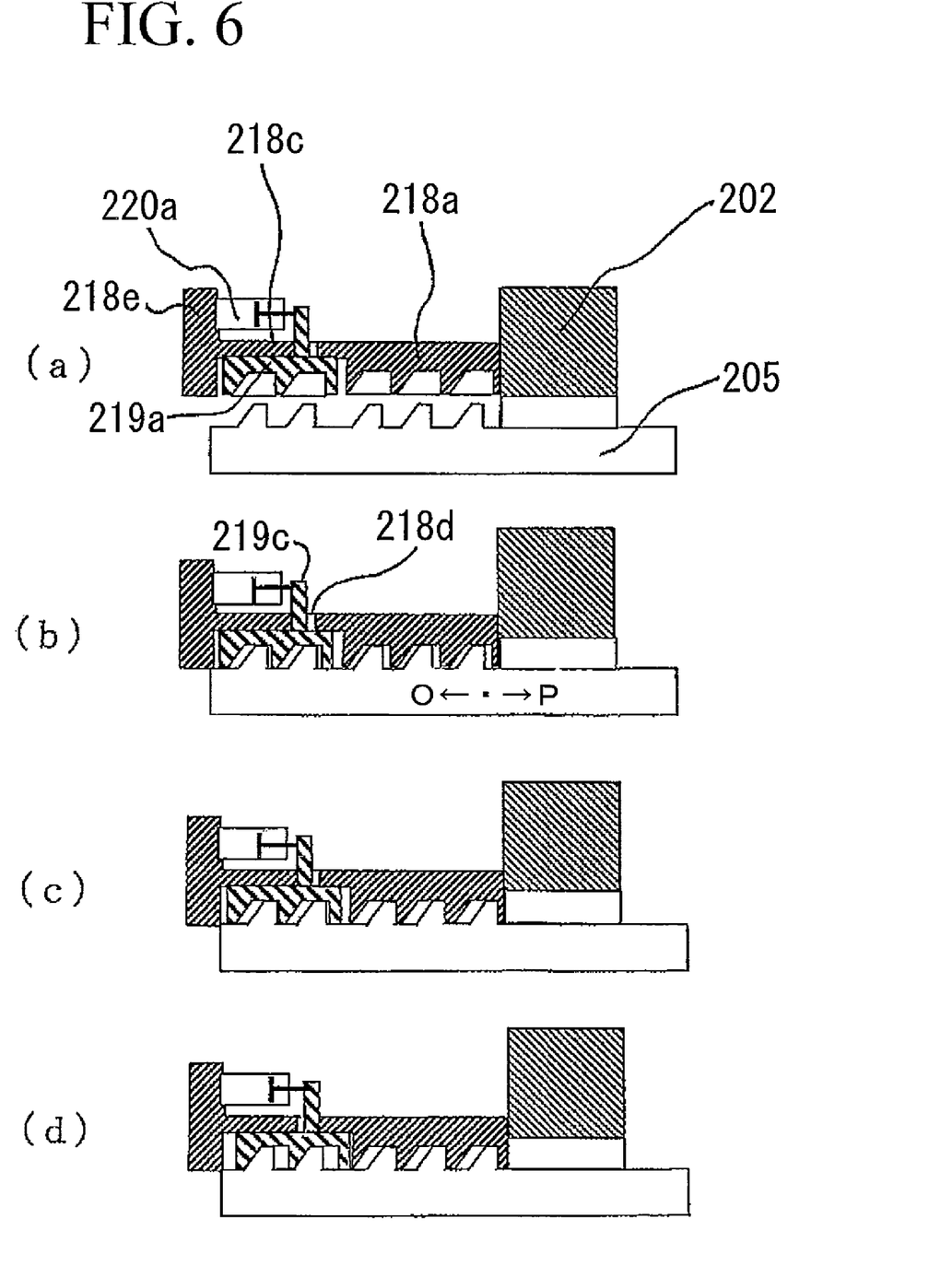
FIG. 6 is a detailed schematic planar cross-sectional view which shows action sequences of the part A given in FIG. 1 and FIG. 2 in a fourth embodiment of the present invention by breaking down into states (a) to (d).

States (a) to (d) in FIG. 6 covering a fourth embodiment of the present invention are detailed schematic planar cross-sectional views which show a part corresponding to the part A given in FIG. 1 and FIG. 2. The part given in the states (a) to (d) in FIG. 6 is substantially similar to that given in the states (a) to (d) in FIG. 5 in actions and structure but different in way of setting an actuator 220a for holding. More specifically, the fourth embodiment is similar to the third embodiment except that a mold clamping half nut 218a is allowed to move back and forth along the movable platen 202 in a direction orthogonal to the shaft of the tie bar 205 and a cylinder portion of the actuator 220a is fixed to a guide part 218c and a perpendicular plate 218e formed integrally with the mold clamping half nut 218a. The reference numerals 218d, 219a and 219c respectively denote a hole, an additional half nut, and a projected member. Therefore, a description of the actions will be omitted here.

It is noted that a hydraulic cylinder is employed as the actuator 217a given in FIG. 5 and the actuator 220a given in FIG. 6, with the magnitude of generated force taken into account. However, it seems that stronger holding force can be achieved when setting an actuator as shown in FIG. 6. In other words, both the hydraulic cylinders can move the additional half nut (one of another pair of additional half nuts) to some extent in the mold clamping direction. However, with consideration given to an area of the piston by which hydraulic pressure is applied, it is clear that the cylinder given in FIG. 6 has an advantage.

Fifth Embodiment

Figure 7:
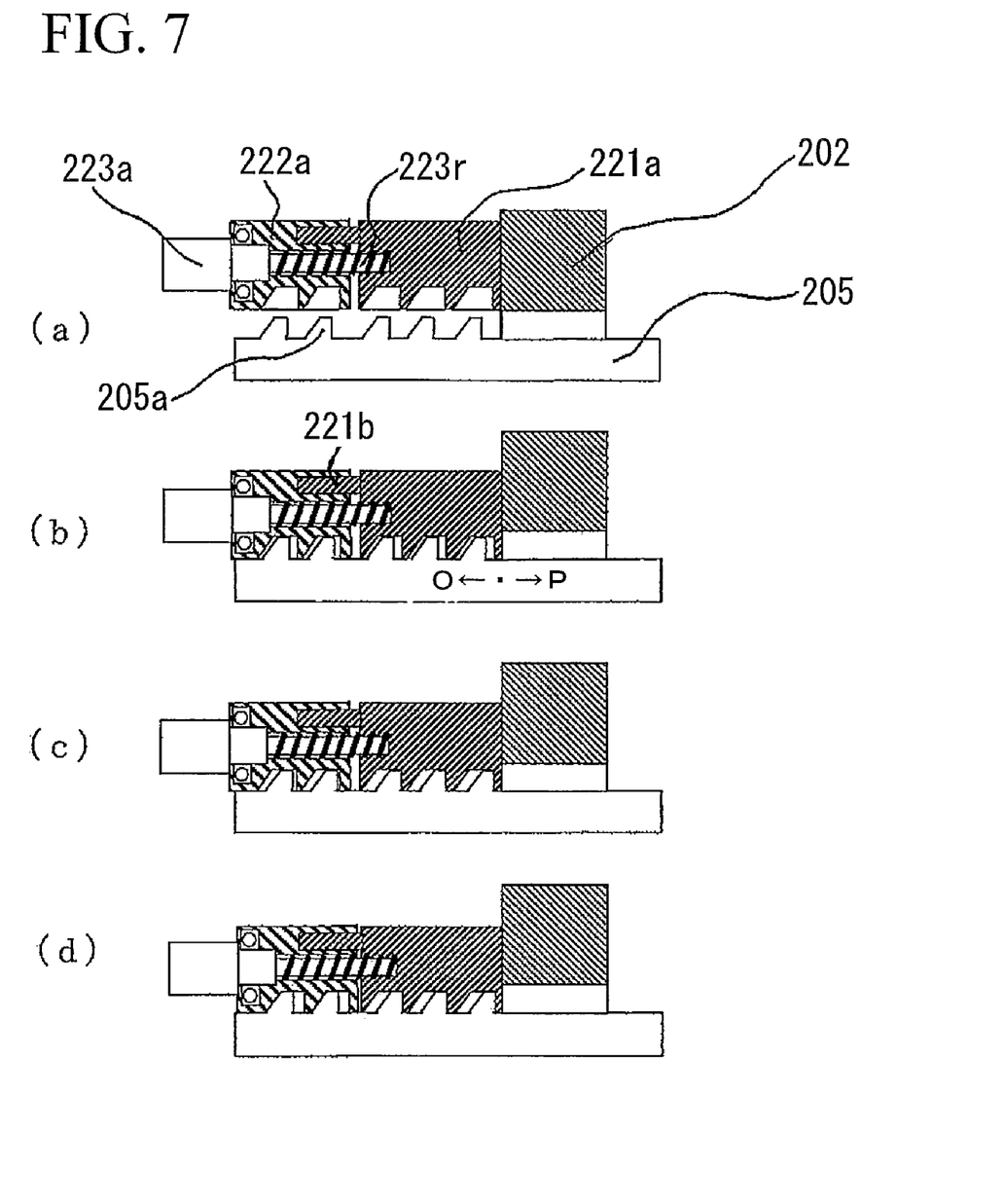
FIG. 7 is a detailed schematic planar cross-sectional view which shows action sequences of the part A given in FIG. 1 and FIG. 2 in a fifth embodiment of the present invention by breaking down into states (a) to (d).

States (a) to (d) in FIG. 7 covering a fifth embodiment of the present invention are detailed schematic planar cross-sectional views which show a part corresponding to the part A given in FIG. 1 and FIG. 2. The fifth embodiment is different from the fourth embodiment in that, in place of the actuator 220a, an electric motor 223a is adopted for driving a screw shaft 223r made up of a ball screw or a trapezoidal screw. More specifically, the mold clamping half nut 218a, the guide part 218c and the additional half nut 219a respectively correspond to a mold clamping half nut 221a, a guide part 221b and an additional half nut 222a. The screw shaft 223r is screwed with an internal screw of the additional half nut 222a. Since the actions are similar to those of the fourth embodiment, a description will be omitted here.

Sixth Embodiment

Figure 8:
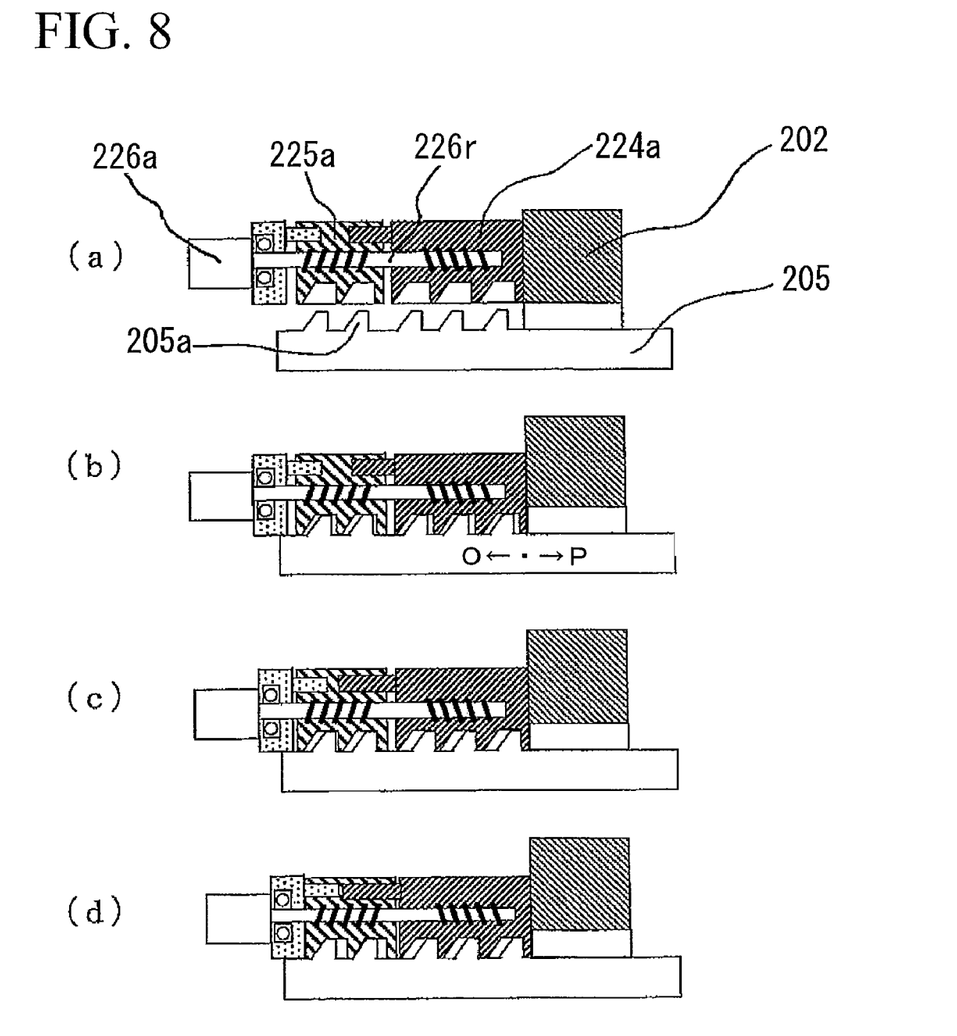
FIG. 8 is a detailed schematic planar cross-sectional view which shows action sequences of the part A given in FIG. 1 and FIG. 2 in a sixth embodiment of the present invention by breaking down into states (a) to (d).

States (a) to (d) in FIG. 8 covering a sixth embodiment of the present invention are detailed schematic planar cross-sectional views which show a part corresponding to the part A given in FIG. 1 and FIG. 2. In the states (a) to (d) in FIG. 8, instead of the screw shaft 223r given in FIG. 7, a screw shaft 226r having two screws in which threads are cut in mutually reverse directions is provided, and internal screw portions corresponding to these two screws are provided in the mold clamping half nut 224a and the additional half nut 225a (one of another pair of additional half nuts). Since they are similar in function to the screw shaft given in FIG. 7, a description of the actions will be omitted here. However, since the reaction force to the holding force of the mold clamping half nut 224a and that of the additional half nut 225a (one of another pair of additional half nuts) can be absorbed by the screw shaft 226r, such effects are provided that loads of the main body of the electric motor 226a are negligible.

Seventh Embodiment

Figure 9:
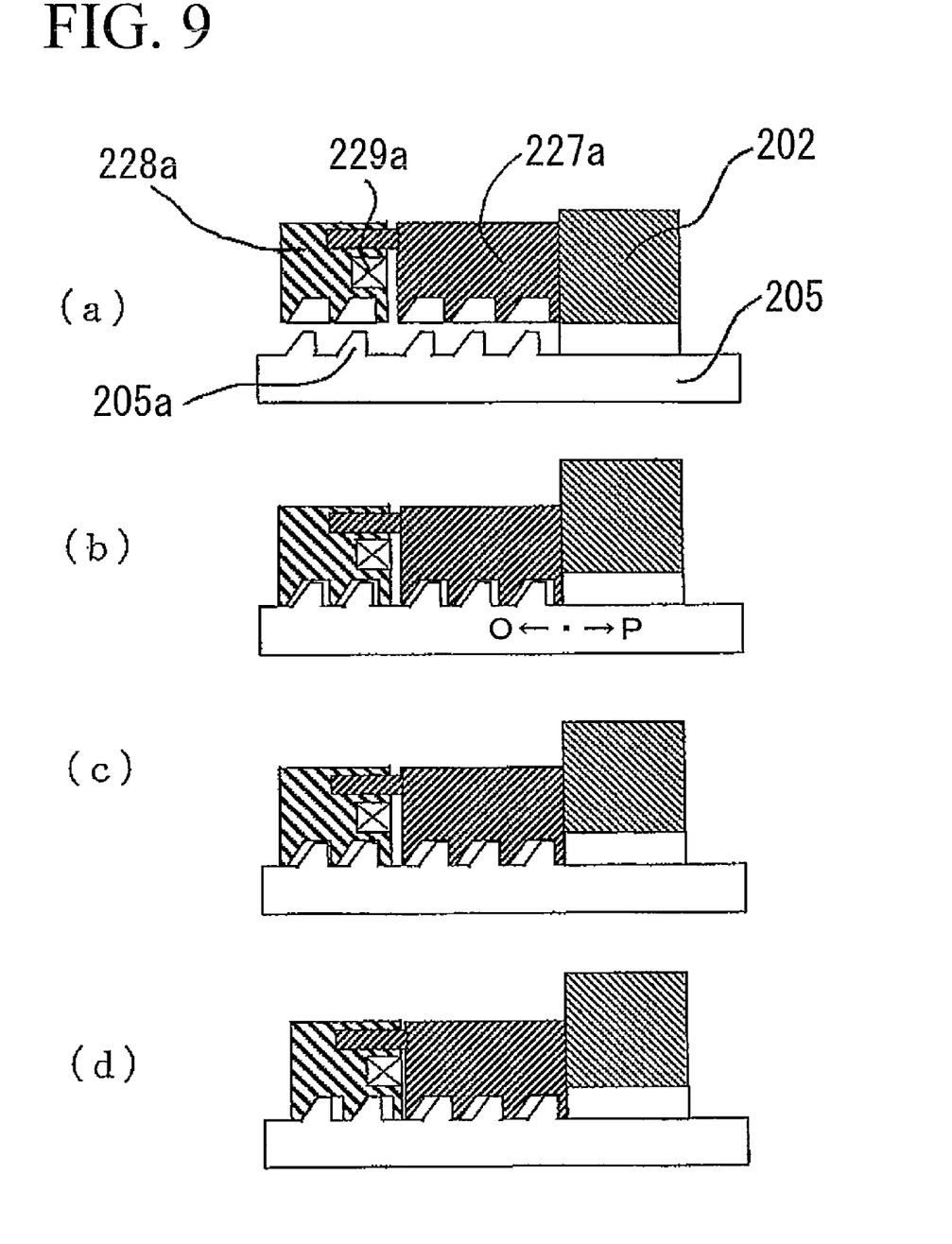
FIG. 9 is a detailed schematic planar cross-sectional view which shows action sequences of the part A given in FIG. 1 and FIG. 2 in a seventh embodiment of the present invention by breaking down into states (a) to (d).

States (a) to (d) in FIG. 9 covering a seventh embodiment of the present invention are detailed schematic planar cross-sectional views which show a part corresponding to the part A given in FIG. 1 and FIG. 2. In the states (a) to (d) in FIG. 9, as an actuator for holding, an electromagnet 229a buried on the side face of the additional half nut 228a opposed to the mold clamping half nut 227a is provided, thereby utilizing suction by electrification. Since the electromagnet 229a is similar in function to the actuators given in FIG. 5 and FIG. 6, a description of the actions will be omitted here.

INDUSTRIAL APPLICABILITY

The present invention relates to a mold clamping device including a fixed platen, a movable platen, a plurality of tie bars, and mold clamping half nuts, in which a pair of additional half members which is restricted in the axial direction of the tie bar and moves in an opening/closing direction of the half nuts relative to the mold clamping half nuts is further provided, and when the mold clamping half nuts are closed and mated with the screw or the ring groove of the tie bar, the additional half members are closed to hold the tie bar so that play at mated parts is removed or cancelled by fixation.

According to the mold clamping device of the present invention, a half nut device annexed for engagement of the movable platen with the tie bar is simply changed in structure merely by adding components or modifying the structure, thereby, the movable platen can be engaged with the tie bar for conducting precise position control without any play, thus making it possible to conduct precision molding such as compression molding and core-back molding.

The invention claimed is:

1. A mold clamping device comprising:
a fixed platen which is installed securely on a machine base, has a plurality of mold clamping cylinders, and retains a fixed mold;
a movable platen which is placed on the machine base, retains a movable mold, and moves back and forth with respect to the fixed platen by a mold opening/closing cylinder;
a plurality of tie bars, each of which is coupled at one end with a piston of the respective mold clamping cylinder, has at the other end part or the central part in the axial direction a screw or a ring groove formed in a serration shape or in a rectangular tooth shape, and penetrates through the movable platen;
mold clamping half nuts which are attached to the movable platen and engaged with or disengaged from the screw or the ring groove of the respective tie bars; and
a pair of additional half members which is attached to the movable platen, is restricted in the axial direction of the respective tie bars, moves in an opening/closing direction of the half nuts relative to the mold clamping half nuts, and engages with or disengages from the screw or the ring groove of the respective tie bars,
wherein when the mold clamping half nuts are closed and mated with the screw or the ring groove of the respective tie bars, the additional half members are closed to hold the respective tie bars so that play at mated parts is removed or cancelled by fixation.

2. The mold clamping device according to claim 1, wherein the additional half members are restricted in the axial direction of the respective tie bars by a nut box which is fixed to the movable platen and accommodates the mold clamping half nuts and the additional half members.

3. The mold clamping device according to claim 2, wherein the additional half members have internally a serration-shaped internal screw or a serration-shaped ring groove which has the same shape as the external screw or the ring groove of the respective tie bars, and when the additional half members hold the respective tie bars by actuation of an actuator for opening and closing the half member, the serration-shaped internal screw or the serration-shaped ring groove is fitted into the external screw or the ring groove of the respective tie bars so as to remove play existing between the mold clamping half nuts and the additional half members by using wedge effects of inclined thread faces.

4. The mold clamping device according to claim 2, wherein the additional half members have internally a brake member which prevents the respective tie bars from sliding by frictional force acting therebetween, and the additional half members hold the respective tie bars by actuation of an actuator for opening and closing the additional half members such that play at the mated parts of the mold clamping half nuts with the respective tie bars is fixed to eliminate movement.

5. The mold clamping device according to claim 3, wherein motions of the actuator for opening and closing the additional half members are driven by a hydraulic cylinder.

6. The mold clamping device according to claim 3, wherein motions of the actuator for opening and closing the additional half members are given by driving a screw shaft by an electric motor.

7. The mold clamping device according to claim 6, wherein the screw shaft driven by the electric motor is a ball screw or a trapezoidal screw.

8. The mold clamping device according to claim 4, wherein motions of the actuator for opening and closing the additional half members are driven by a hydraulic cylinder.

9. The mold clamping device according to claim 4, wherein motions of the actuator for opening and closing the additional half members are given by driving a screw shaft by an electric motor.

10. The mold clamping device according to claim 9, wherein the screw shaft driven by the electric motor is a ball screw or a trapezoidal screw.

* * * * *